Sept. 30, 1941.     B. HERSKOVITS     2,257,115
TAXIMETER CONTROL DEVICE
Filed June 25, 1938     2 Sheets-Sheet 2
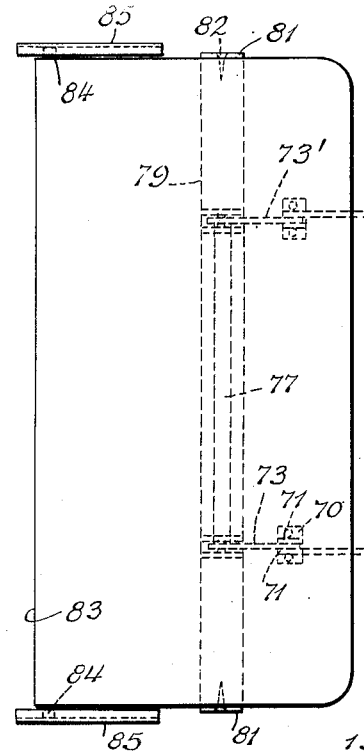
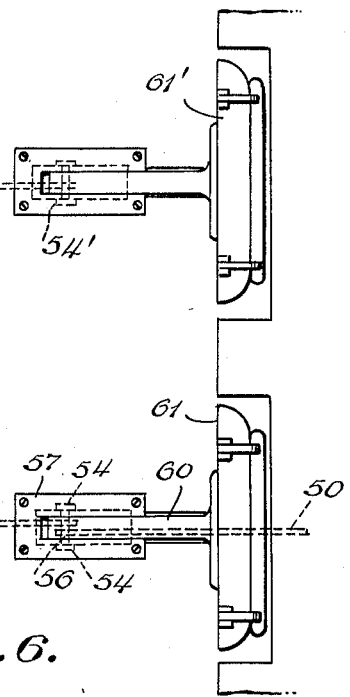
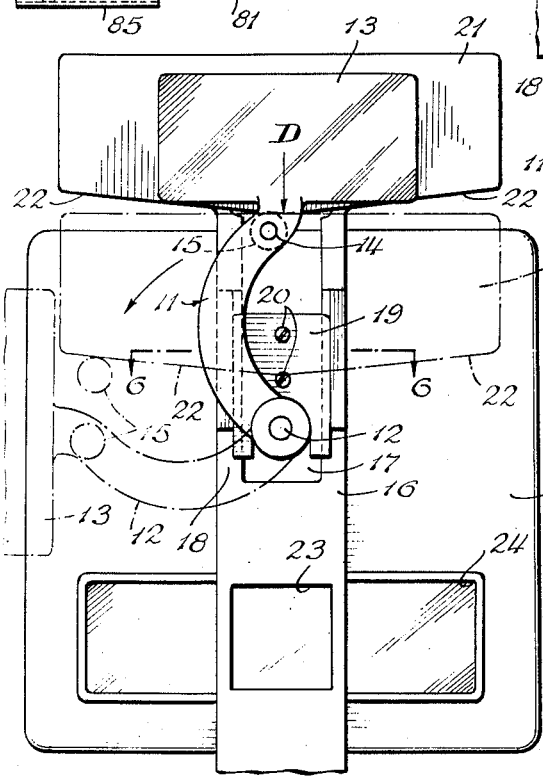
INVENTOR.
Benjamin Herskovits
BY J. F. Basseches
ATTORNEY Patented Sept. 30, 1941

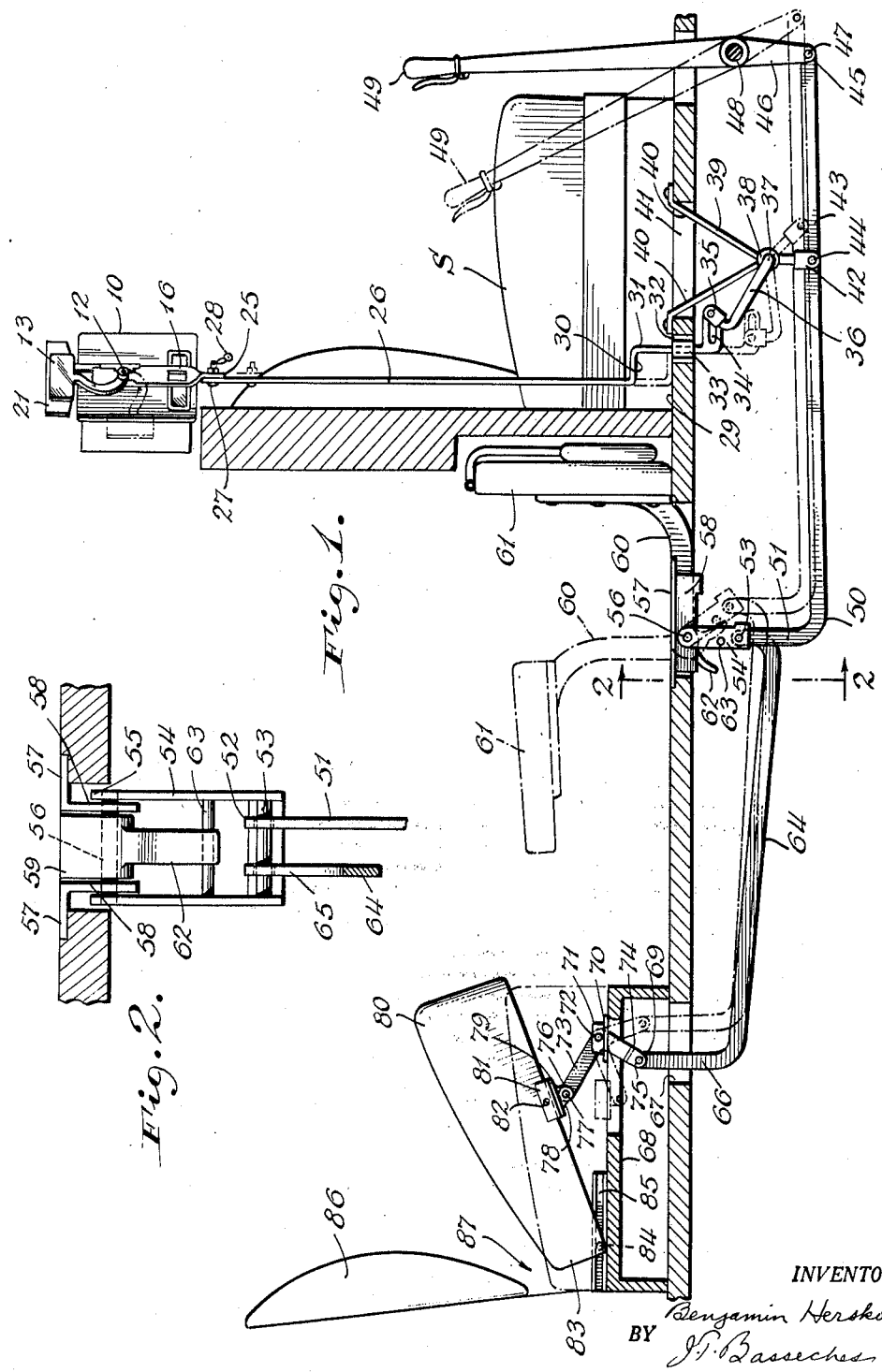

2,257,115

UNITED STATES PATENT OFFICE 2,257,115

TAXIMETER CONTROL DEVICE

Benjamin Herskovits, New York, N. Y., assignor of forty-five one-hundredths to Morris Segal, New York, N. Y.

Application June 25, 1938, Serial No. 215,826

3 Claims. (Cl. 235—30)

This invention relates to a meter control device for vehicles; more particularly, to a taximeter control device.

My invention relates more specifically to installations to be associated with devices such as taxicabs, in order to assure that the metering device is in operation, when this type of vehicle is conveying one or more passengers. In vehicles of this character frequently the operator fails to place the meter in registering position and this oversight results in considerable loss of revenue to the owner, especially one who may operate fleets of such vehicles. Surreptitious operation is not infrequent, also resulting in loss of revenue to the owner of the taxicab.

Whether the operator of vehicles of this character has inadvertently or deliberately omitted to set the meter, the driver is subject to censure by policing organizations, in accordance with local ordinances protecting the owner as well as the passenger of the vehicle.

To overcome these shortcomings of metered public conveyances of this character, with infallability, while still retaining simplicity of installation and construction, I have as an object of my invention provided a coordinated assembly to be combined with the metering device of a public conveyance, such as a taxicab, which includes means for setting the taximeter upon occupancy of the vehicle; the provision of an installation to be coordinated between the seating devices of a taxicab and the meter, for setting the meter upon occupancy, or alternatively, for manually setting the meter upon occupancy of the vehicle. More particularly, it is an object of my invention to provide in a public conveyance of the character such as a taxicab, coordinated linkage between a taximeter and the seating contrivance of the same which, under normal conditions, when not occupied renders the seats unavailable, but upon being occupied, positively serves to set the meter.

It is further contemplated by my invention to include the association with a taximeter, of means to locate the seats thereof unfit for occupancy and include operative means for simultaneously setting the meter in registering position and positioning the seats for their intended purpose.

It is further contemplated by my invention to provide a coordinated linkage between the meter and one or more seats of a taxicab so that the weight of a passenger will serve to set the meter in registering position, and include means for placing the signalling device of said meter in the operative or occupied signalling position.

Other objects of my invention reside in the provision of a coordinated installation between the seating contrivances of a taxicab and the metering device which will prevent loss of revenue when the vehicle is occupied and one which is tamperproof, yet may be installed in existing constructions without material alteration of existing contrivances, such as the taximeter, and further, to provide an installation of the character described which may be conveniently and economically installed with existing constructions.

Still further objects of my invention reside in the provision of an installation to avoid loss of revenue in connection with public vehicles, such as taxicabs, which retains the vehicle in form complying with the various ordinances controlling the operation of these vehicles, while including positiveness of operation, free from tampering.

To attain these objects and such further objects as may appear herein or be hereinafter pointed out, I make reference to the accompanying drawings, forming a part hereof, in which—

Figure 1 is a fragmentary schematic view of the installation embodying my invention;

Figure 2 is a section taken on the line 2—2 of Figure 1;

Figure 3 is a fragmentary plan view thereof;

Figure 4 is an enlarged view of the meter assembly;

Figure 5 is a fragmentary side elevation of the same;

Figure 6 is a fragmentary detail sectional view taken on the line 6—6 of Figure 4.

Making reference to the drawings, I have illustrated my invention for purposes of exemplification in connection with a taximeter 10, which includes an operative arm 11, mounted upon a spindle 12, connected to the operating mechanism. This arm terminates at its free portion in an indicator 13, commonly referred to as a "flag." This flag may operate only in a counter-clockwise direction, as shown in dotted lines in Figures 1 and 4. In the upstanding position, the flag 13 indicates the unset or non-registering position. A counter-clockwise quarter turn sets the meter 10 into operating position.

In order that the movement of the flag 13 to the operating position may not be left entirely to the operator, usually seated at the seat S, I associate with the same a meter operating linkage which is set in the registering position upon the occupancy of any seat or may be set in the registering position by the driver of the vehicle, as will more clearly appear as this description proceeds.

For this purpose, the flag meter arm 11 has affixed on its inner face a stub shaft 14 upon which a roller 15 is mounted. In the space between the arm 11 and the meter 10 there is disposed a bar 16, formed with a cut out 17, which straddles the spindle 12 and has branches 18. A guide plate 19 is secured to the meter by bolts 20, thereby serving to hold the bar 16 in vertical up and down sliding position. The extreme end of the member 16 is provided with an auxiliary flag 21, the lower edges 22 whereof being formed with camming faces, coordinated to engage the roller 15 so that the engagement is always off the dead-center position D, the dead-center being the intersecting lines of the faces 22 adjacent the medial vertical line through the auxiliary flag 21.

It will be observed at this point that downward movement of the arm 16 will serve to effect transmission of the movement to the roller 15 by the camming engagement made by the left hand camming face 22. The throw of the flag 13 is thereby accomplished rotatively in a counter-clockwise direction, it being understood that in these devices a slight dislocation of the flag 13 causes it to snap completely into a quarter turn position, thereby more or less kicking over into the registering position shown in dotted lines in Figures 1 and 4.

The coordination of this device with the operating mechanism will appear more clearly as this description proceeds.

The lower end of the arm 16 may be formed with a cutout 23 where it overlies the window 24 of the meter, to permit the counter figures visible therethrough, to remain unobscured.

The extreme end 25 of the arm 16 is connected with a bar 26 by bolts 27, which may be sealed by lead seals 28 so that once the connection has been effected, separation may only be accomplished by breaking the seals 28. The connection otherwise permits convenient installation of the assembly hereinafter described.

The bar 26 is downwardly directed toward the floor board 29 adjacent the driver's seat S and includes an offset 30 which limits the downward movement of the bar 26 to the point where it engages the upper surface of the floor board 29. The branch 31 of the bar is then directed through an opening 32 formed in the floor board and is positively guided therethrough by a guide 33, to assure free and controlled vertical sliding movement. The bar 26 terminates in a guide loop 34 and is engaged by a knuckle pin 35, mounted on a bell crank lever 36. The bell crank lever has a bearing portion 37, journalled at 38 in the hanger 39. This hanger comprises spaced branches 40 directed through an opening 41 in the floor board, at which point the branches are bolted down to the floor board.

The bell crank lever 36 has its free end 42 bifurcated and straddles a linkage bar 43, being positively connected thereto by a rivet or pin 44 passing through the bifurcation 42, and the bar 43, through an opening formed in the bar 43, as will be readily understood.

The bar 43 has its end 45 connected to a lever or brake arm 46 by a rivet or pin 47, passing through the lever arm 46. The lever arm 46 is fixedly carried upon a cross shaft 48 for imparting reciprocating movement to the bar 43, upon manual manipulation of the handle portion 49 adjacent the upper free end thereof.

The rearward end portion 50 of the bar 43 is angularly upturned to provide the branch 51, which is provided with an opening at its extreme end 52, and engages a pintle 53, mounted upon the linkage 54. The upper end 55 of the link 54 is connected to the pintle bolt 56, suspended from the bracket plate 57 of the flange 58 thereof. The pintle bolt 56 also serves to pivotally mount the terminal end 59 of the bracket 60 for a Pullman seat 61.

Extended from the terminal end 59 of the seat bracket 60 there is disposed a finger 62. This finger is extended sufficiently to ride between the linkage 54 but upon pivotal movement of the Pullman seat 61 to the seated position, as shown in dotted lines in Figure 1, the extended finger 62 engages a cross bar 63 connected to the linkage 54. It will thus be observed that the linkage 54 has a lost motion effect, being swingable independent of the pivotal movement of the Pullman seat 61 and may swing freely when the Pullman seat 61 is in the folded position shown in Figures 1 and 3; but may be positively operated to transmit movement through the link 54 when the Pullman seat 61 is swung to the seated position.

Suspended from the linkage 54 through the medium of the pintle 53 is the secondary bar 64 through the medium of the branch 65, having an orifice to receive the pintle 53. The bar 64 has an upwardly directed branch 66 and passes upwardly through an opening 67 in the floor board immediately under a platform 68, so that the end 69 of the branch 66 is disposed immediately under the platform 68.

Mounted upon the upper surface of the platform 68, I provide a pair of brackets 70, which have spaced upstanding ears 71 connected by a pin 72, which serves as a pivotal pin for a bell crank lever 73. The bell crank lever 73 has a lower branch 74 connected to the end 69 by a rivet or pin 75.

The bell crank lever 73 has its upper free end 76 pivotally mounted upon a shaft 77. The shaft 77 passes through ears 78, forming part of a cradle 79. Mounted upon the cradle is the rear seat 80, which is affixed to the cradle by upstanding flanges 81 and screws or bolts 82, passing through the upstanding flanges 81 into the side walls of the seat 80, the location of attachment of the cradle 79 to the seat 80 being about at the mid-point of the seat 80, to give a substantial tilting movement during operation, as will appear more clearly hereinafter.

The back end 83 of the seat 80 is provided at its lower corners with pins 84 extending laterally into U-shaped channel guides 85.

It will be observed that the seat 80 is limited to a sliding, tiltable movement as determined by the radius of the arm 76 of the bell crank lever 73 about the pivot 72 and the slidable movement of the pins 84 in the guide channels 85. This sliding tiltable movement also permits access to the space usually found back of the rear seat 80 immediately underneath the back rest 86, forming a hand opening 87, through which articles may conveniently be reached, or permitting inspection as required by certain city ordinances.

Connected to the cradle 79 is a left Pullman seat linkage, and this is accomplished by a second bell crank lever 73', connected to a bar 64', in all respects similar to the assembly associated with the bar 64. The bar 64' is connected to a linkage 54' identical with the linkage connection 54, but associated with the left Pullman seat 61'. The left hand Pullman seat assembly and the linkage connected therewith in all respects are identical with the linkage connected with the right hand Pullman seat 61, it being understood that tilting of either one or both of the right or left hand Pullman seats 61 or 61' may transmit movement to the suspended linkage 54 or 54', back through the cradle 79 and the bell crank levers 73 and 73' connected therewith.

It will also be observed that by the construction provided, movement for occupancy of any one of the seats 61, 61' or 80 will impart swinging movement to the linkage 54.

It will be observed that should anyone place his weight upon the seat 80 or swing any one of the seats 61 or 61' to the seated position, there will be transmitted through the bar 64 or through the bar 64', back through the cradle assembly 79, swinging movement to the linkage 54 from the position shown in full lines in Figure 1, to the dotted line position. This swinging action transmits movement to the bar 43 and the bell crank lever 36 connected therewith. The lever 36 in turn imparts reciprocating movement to the bar 26, pulling the same downwardly, carrying with it the auxiliary flag 21 which, through the medium of the camming edges 22, imparts rotary counter-clockwise movement to the flag arm 11 transmitted to the latter by the camming action of the edge 22 against the roller 15. This serves to set the meter in the operating position.

To reset the flag 13 in the "off" position shown in Figures 4 and 5, the operation of the device requires that the auxiliary flag 21 provided with the camming edges 22—22, first be raised, including the replacement of the seat 61, 61' and 80 to the original position shown in full lines in Figure 1 (also Figure 3). This is accomplished by the manually operable element 49. It will be apparent that during such time as the auxiliary flag 21 and the camming edges thereon provided is in the position shown in the dotted line in Figure 5, the flag arm 11 can still rotate in a counter-clockwise direction for two successive one quarter turns, with the form of the meter illustrated, but since the right hand camming edge 22 lies in the path of the roller 15 carried by the arm 11, the third quarter turn of the arm 11 to reset the arm 11 in the "off" position cannot be achieved. Thus, until such position of the camming edges 22—22 is assumed, i. e. to that shown in full lines in Figure 1, the camming edges 22—22 in the position shown in dotted line only permits the arm 11 of said signalling means to be independently operable to the non-registering or "waiting time" position, at which position the meter increases the tariff only by actual mileage added.

Upon resetting of the seats to that shown in full lines in Figure 1, the auxiliary flag 21 is moved to the full "up" position, positioning the camming edges 22—22 so that the right hand camming edge 22 is out of the path of the roller 15, and then only can the flag arm 11 be independently operated to move to the full "off" position.

Conversely, in order to save embarrassment to any passenger who may enter the taxicab, the taxicab operator seated on the seat S may manually operate the brake lever 46 by pulling the same backwardly to the dotted position shown in Figure 1. This action, through the bar 43, transmitted to the linkage 54 and the bar 64, serves to set the seat in a position for occupancy. Simultaneously, through the medium of the bell crank lever 36, movement is transmitted to the bar 26, to pull the same downwardly which, in turn, will operate the flag arm 11.

It will be thus observed that the mechanism may be set to place the meter in operative position manually through the medium of the brake lever 46, which simultaneously places the seat in the convenient position for occupancy and, conversely, should one put any weight upon the seat 80 or either one or both of the seats 61 or 61', reciprocating movement will be imparted to the bar 62, to draw the same downwardly so that this movement will rotatably operate the flag arm 11 in the manner already described.

It will also be observed that the lever member 49 may optionally include a ratchet holding means usually associated with brake levers to hold the seat S' and linkage assembly so that the seat is held in the unoccupied position in positive condition, and may not accidentally be disturbed.

The device otherwise and without this ratchet means, inherently is coordinated by reason of the linkage and arrangement of the parts to frictionally resist displacement except by the weight of a passenger or the tilting of the seats 61.

By this construction, it will be observed that a positive, tamper-proof installation is provided, to be associated with a vehicle of the character described, avoiding forgetfulness on the part of the chauffeur and possible surreptitious occupancy of the vehicle.

It will be understood that while I have described and illustrated the preferred installation of inexpensive character, which may conveniently be installed in existing constructions, with very little alteration of existing constructions, the illustration made is for exemplification only and the scope of my invention is to be determined by the scope of the appended claims.

Having thus described my invention and illustrated its use, what I claim as new and desire to secure by Letters Patent, is:

1. In a vehicle-metering device of the character described including a taximeter provided with a rotatable register setting means to set the taximeter to the registering or non-registering positions, the combination therewith of an assembly adapted for ready attachment as a unit to said taximeter, comprising a camming member having a portion arranged to be mounted in the path of a portion of said register-setting means to engage and position said setting means into registering position upon having motion transmitted to said member by motion transmitting means adapted to move upon movement of a seat of said vehicle to an occupying position, said member otherwise permitting said register setting means to move into intermediate positions, said member including another portion extending into the path of movement of said registering setting means preventing movement thereof to the non-registering position until said motion transmitting means has been positioned to the non-occupancy positions of the seats of said vehicle.

2. In a vehicle-metering device of the character described including a taximeter provided with a rotatable register setting arm to set the taximeter to the registering or non-registering positions, the combination therewith comprising an extension on said arm, a member slidably mounted with respect to said arm including oppositely disposed camming portions, arranged to be mounted in the path of the roller of said arm, one camming portion serving to engage said extension of said arm and position said arm into registering position upon having motion transmitted to said member by motion transmitting means adapted to move upon movement of a seat of said vehicle to an occupying position, the other of said camming portions extending into the path of said extension on said arm preventing movement thereof to the non-registering position until said motion transmitting means has been positioned to the non-occupying positions of the seats of said vehicle.

3. In a vehicle-metering device in accordance with claim 1, the combination wherein said motion transmitting means are connected by linkage to independent manually operable means to set the primary seats of said vehicle to the occupying position and to impart setting movement to said member.

BENJAMIN HERSKOVITS.